United States Patent [19]

Spielvogel

[11] 4,076,210
[45] Feb. 28, 1978

[54] HYDRAULIC VALVE

[75] Inventor: Harry Spielvogel, Dusseldorf, Germany

[73] Assignee: Schloemann-Siemag Aktiengesellschaft, Germany

[21] Appl. No.: 553,735

[22] Filed: Feb. 27, 1975

[30] Foreign Application Priority Data

Mar. 2, 1974 Germany .............................. 2410077

[51] Int. Cl.² .............................................. F16K 51/00
[52] U.S. Cl. ...................................... 251/285; 251/42; 251/60; 251/63.4; 251/63.5; 251/284
[58] Field of Search .................... 251/285, 42, 60, 284, 251/63, 63.4, 63.5, 63.6; 92/13.1, 13.5, 13.6, 13.8

[56] References Cited

U.S. PATENT DOCUMENTS

| | | | |
|---|---|---|---|
| 1,710,055 | 4/1929 | Grant | 251/63.4 |
| 2,272,091 | 2/1942 | Loewe | 92/13.6 |
| 2,586,906 | 2/1952 | Beckett et al. | 251/285 |
| 3,155,365 | 11/1964 | Hartung et al. | 251/285 |
| 3,159,375 | 12/1964 | Schrecongost et al. | 251/31 |
| 3,213,886 | 10/1965 | Pearne | 92/13.1 |
| 3,626,807 | 12/1971 | Shartzer | 92/13.6 |
| 3,631,887 | 1/1972 | Schlechtriem et al. | 251/63.4 |
| 3,815,480 | 6/1974 | Spyra | 92/13.8 |
| 3,818,805 | 6/1974 | Johansson | 92/13.6 |

Primary Examiner—William R. Cline
Assistant Examiner—H. Jay Spiegel
Attorney, Agent, or Firm—Holman & Stern

[57] ABSTRACT

A hydraulic valve has a valve member whose travel is limited at one end by an abutment. The abutment is part of a hydraulic piston-cylinder arrangement, and when the piston-cylinder arrangement is pressurized and the valve member is moved to the end of its travel, the abutment is held in a first position where the valve is only open to a small extent. If the piston-cylinder arrangement is then pressure-relieved, the force moving the valve member against the abutment displaces the abutment so that the valve can open further.

2 Claims, 3 Drawing Figures

HYDRAULIC VALVE

FIELD OF THE INVENTION

The invention relates to a hydraulic valve with means for setting the flow cross-section. The valve may, for example, be a directional valve, a restrictor valve or a controlled non-return valve.

BACKGROUND OF THE INVENTION

It is known to adjust the flow cross-section of valves by simple restriction of the length of stroke, in order for example, to influence the speed of hydraulic loads such as hydraulic motors and operating cylinders. Such stroke limitation is manually and mechanically set by means of an adjustable stop abutment screw.

It is a disadvantage of this manner of adjustment that a plurality of main valves must be used to achieve two independently adjustable flow cross-sections, thus substantially increasing the cost of controls for hydraulic loads.

The prior art also discloses servo valves which can be used as regulating valves for the continuous adaptation of the flow cross-section and therefore of the speed of the appropriate electrical control. Owing to the large amount of electrical equipment and the need for satisfying special conditions regarding the filtering of the hydraulic fluid and because of maintenance requirements this method is too costly for simple control functions.

SUMMARY OF THE INVENTION

According to the invention, there is provided a hydraulic valve with an axially movable valve member and a stop abutment for the valve member at one end of its travel, which abutment is hydraulically positionable for setting the flow cross-section of the valve.

In such a valve, a single control can provide two independent flow cross-sections which can be altered at any time without substantial effort to suit the flow requirements. These requirements may be different speeds of hydraulic motors or operating cylinders during their operating motion as well as starting and deceleration of substantial moving masses. The invention can be applied to all pilot-controlled directional valves, such as spool valves or seat valves, for limiting the desired stroke of the spool or valve member and therefore allowing variation of the flow cross-section.

DESCRIPTION OF THE DRAWINGS

The invention will now be further described, by way of example, with reference to the accompanying drawings, in which.

DESCRIPTION OF THE PREFERRED EMBODIMENT

Figure 1:
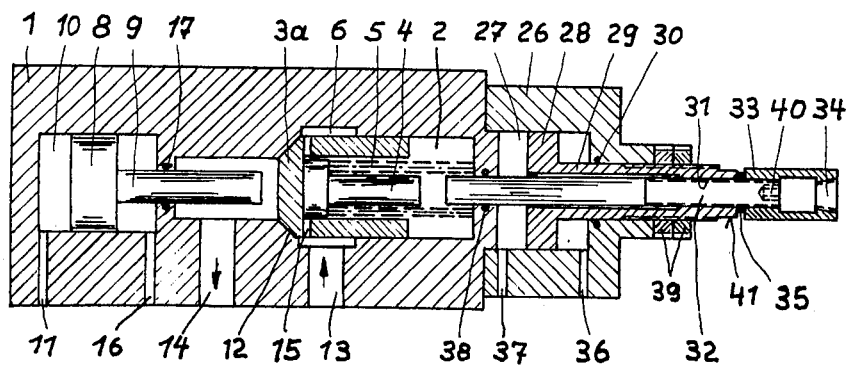
FIG. 1 is a section through a controlled non-return valve with two stroke limitations.
Figure 2:
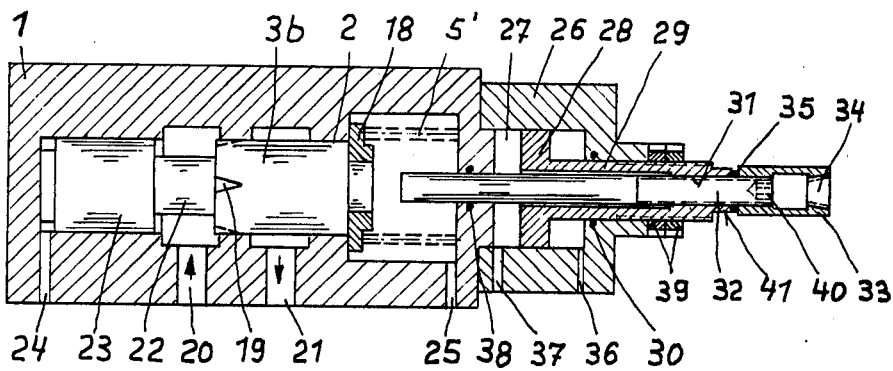
FIG. 2 is a section through a 2/2 directional valve with two stroke limitations and FIG. 3 is a symbolic flow diagram.

A valve member in the form of a valve cone 3a or a valve spool 3b slides in a cylindrical bore 2 in a valve casing 1 of a controlled non-return valve (FIG. 1) or of a 2/3 directional valve (FIG. 2). The controlled non-return valve of FIG. 1 will be first described. The valve cone 3a is constructed as a bush which is open on one end and whose interior supports a spacer bolt 4 with a collar. A restoring spring 5 is provided between the collar of the spacer bolt 4 and the internal wall of the valve casing 1 to bias the valve cone to the left in the Figure. A cylindrical annular chamber 6 is provided in the valve casing 1 in the zone of the valve cone 3a for the supply of hydraulic working fluid which is to be controlled.

A bottoming piston 8 with a piston shank 9 slides in the valve casing 1 along the axis of the valve cone 3a in a cylindrical bore 10 on the valve seat side of the valve cone. The bottoming piston 8, which can be biased with hydraulic control pressure through a port 11, thrusts the valve cone 3a forward from its valve seat 12 by means of the spool shank 9. The hydraulic working fluid which enters the cylindrical annular chamber 6 through a port 13 is thus able to flow through a discharge port 14 to the hydraulic load. Compensating ports 15 through which working fluid can flow to equalize the pressure on either side of the valve cone are also provided in the wall of the cone 3a. The valve casing 1 is also provided with a discharge port 16 for the discharge of leakage oil from the non-working side of the bottoming piston 8. Seal elements 17 seal the piston shank 9 between the cylindrical bore 10 and the discharge bore 14 for the hydraulic working fluid.

In the FIG. 2 embodiment, a restoring spring 5' is provided between a centering stop abutment 18 (FIG. 2) of the valve spool 3b and the internal end wall of the valve casing 1. The control surface of the valve spool 3b includes wedge-shaped control grooves 19 through which hydraulic working fluid flows from the port 20 via the discharge bore 21 to the hydraulic load in the appropriate open position of the valve spool. On the left-hand side of the control grooves 19 the valve spool 3b is connected by means of a piston shank 22 to a piston 23 whose left-hand side can be biased with control fluid through an inlet port 24. A port 25 is provided in the wall of the valve casing 1 in the zone of the restoring spring 5' to permit the discharge of any leakage oil.

A cylinder casing 26 in whose cylinder 27 a piston 28 is adapted to slide is mounted on the right-hand side of the valve casing 1 (FIG. 1 and FIG. 2). The piston shank 29 extends from the cylinder casing 26 to the outside. Seal elements 30 are provided between the cylinder housing wall and the piston shank 29.

The piston 28 and its piston shank 29 are provided with a screwthreaded bore 31 in which a screwthreaded bolt 32 is disposed so as to be axially movable therein. The part extending from the piston shank 29 is provided with a cap nut 33 the closed end of which is provided with a screwthreaded plug 34 which can be removed to gain access to the end of the bolt 32. The cap nut 33 locks the screwthreaded bolt 32 with respect to the spool shank 29 of the piston 28. A seal element 35 is also provided between the spool shank 29 and the end face of the cap nut 33 to prevent the discharge of leakage oil.

A port 36 for the hydraulic control fluid and a further port 37 for the discharge of leakage oil are disposed in the cylinder casing 26. The frontal smooth part of the screwthreaded bolt 32 passes along the axis of the valve cone 3a or of the valve spool 3b through the wall of the valve casing 1, said wall being provided with further seal elements 38.

To set the limits of travel of the piston 28, the piston shank 29 which projects from the cylinder casing 26 and is associated with the piston 28 is provided with two lock nuts 39 which can be locked against each other. The rearward part of the screwthreaded bolt 32 which is disposed within the cap nut 33 is provided with a slot or a hexagon socket 40 to permit adjustment with respect to the piston 28, access to the slot or socket 40 being by way of the opening for the plug 34. Spanner surfaces 41 on the piston 28 permit the latter to be held when the position of the lock nuts 39 is adjusted.

Figure 3:
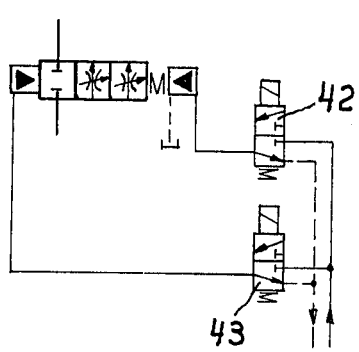

The symbolic flow diagram (FIG. 3) corresponds to the three possible control positions of the directional valve which are made possible by virtue of the invention, the valve being constructed for example as a 2/3 directional valve. The bottoming piston 8, the annular surface of the piston 23 and the annular surface of the piston 28 are biased with control pressure through separate solenoid pilot valves 42 and 43, which are of a conventional type. In the position shown in FIG. 3, both pilot valves are closed, but either one or both of them can be opened by activating their respective solenoids.

The operation of setting a different flow cross-section is carried out as follows:

The left-hand end position of the piston 28 can be adjusted by means of the two nuts 39, the screwthreaded bolt 32 in the piston 28 being simultaneously adjusted so that its endface in its function as a stop abutment is situated at the required distance from the spacer bolt 4 of the valve cone 3a or from the valve spool 3b. The application of control pressure to the annular piston surface of the piston 28 through the port 36 causes the piston to be driven into its left-hand limiting position. In FIG. 1, the biased surface of the bottoming spool 8 is smaller than the annular surface of the piston 28, so after the bottoming piston 8 (FIG. 1) is biased through the port 11, the valve cone 3a is thrust until it abuts upon the screwthreaded bolt 32 to open a relatively small flow cross-section for the working pressure medium. If the annular surface of the piston 28 is then pressure-relieved, the bottoming piston 8 will drive the valve cone, the screwthreaded bolt 32 and therefore the piston 28 into the right-hand limiting position, i.e. where the piston 28 abuts the right-hand end of its cylinder casing 26. A second larger flow cross-section is thus released for the working pressure medium past the valve cone 3a if the screwthreaded bolt 32 was previously appropriately adjusted in the piston 28.

The same procedure takes place when the left-hand piston 23 (FIG. 2) is biased with pressure fluid through the port 24. The spool 3b is thrust until it abuts the screwthreaded bolt 32, a small cross-section being initially exposed for the working pressure medium which passes through the wedge-shaped control grooves 19. When the annular surface of the piston 28 is pressure-relieved, the left hand valve piston 23 thrusts the screwthreaded bolt 32 and therefore the piston 28 via the valve spool 3b into the right-hand limiting position. A second larger cross-section is thus exposed for the working pressure medium on the control spool 3b if the screwthreaded bolt 32 was previously appropriately adjusted in the piston 28. The control grooves 19 can be of any number and configuration to appropriately vary the alteration in flow cross-section as the valve spool 3b moves to the right as shown in FIG. 2.

I claim:
1. A hydraulic valve comprising: housing means;
   a valve member axially movable within said housing means;
   a cylinder formed in said housing means;
   a first hydraulically actuated stepped piston slidable in said cylinder, said piston having a shank with a threaded bore, said shank further including an outer threaded portion which extends out of said cylinder;
   lock nuts, engageable with said outer threaded portion of said shank, for adjusting the travel of said first piston in said cylinder;
   a threaded piston rod, threadably received into said threaded bore of said first piston shank, forming a stop abutment for limiting axial movement of said valve member, said threaded rod axially adjustable in said first piston; and
   means for positively biasing said valve member against said stop abutment when said valve member is open, said means for positively biasing said valve member comprising a hydraulic biasing piston for biasing the valve member towards the stop abutment, and spring means for biasing the valve member away from said stop abutment.
2. The hydraulic valve of 1 wherein the largest piston face area of said hydraulic biasing piston is smaller than the smallest piston face area of said first piston.

* * * * *